C. B. YAW.
TYPE WRITING MACHINE.
APPLICATION FILED SEPT. 5, 1906.

979,630.

Patented Dec. 27, 1910.
6 SHEETS—SHEET 3.

WITNESSES
J. B. Reeves
Charles E. Smith

INVENTOR:
Chas B. Yaw.
By Jacob Felbel
HIS ATTORNEY

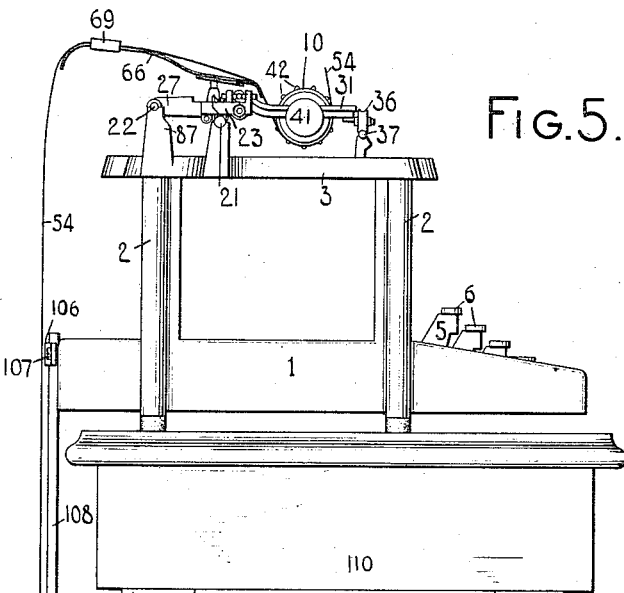
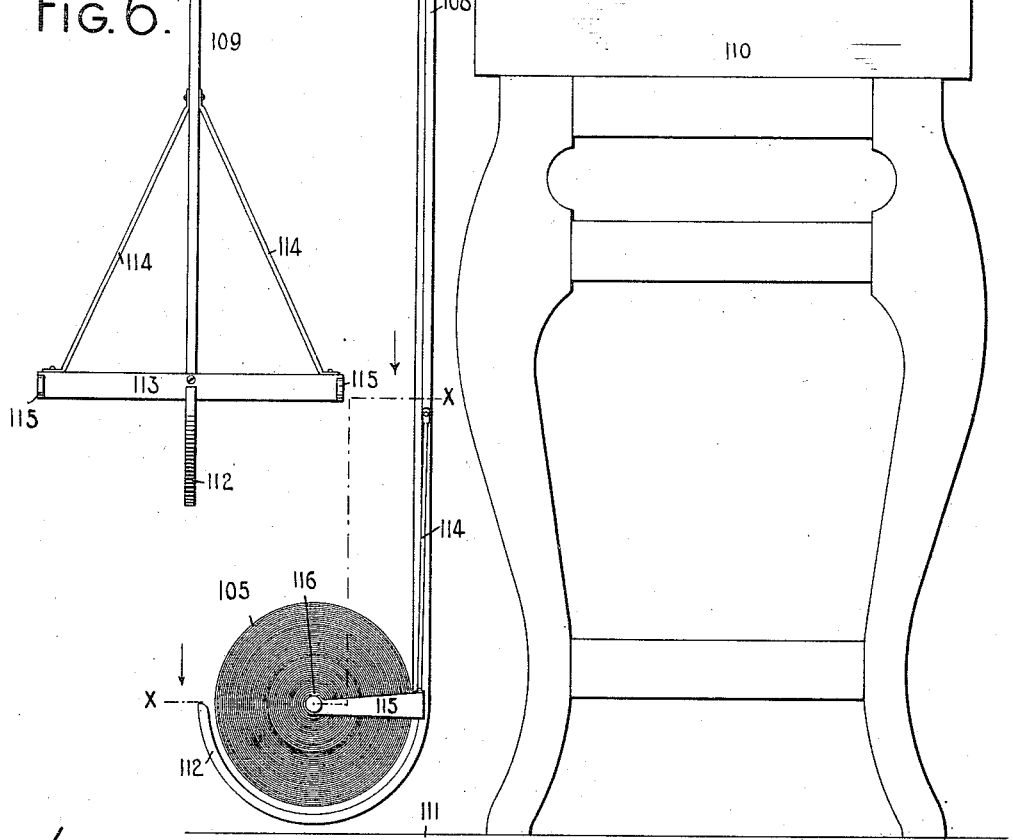

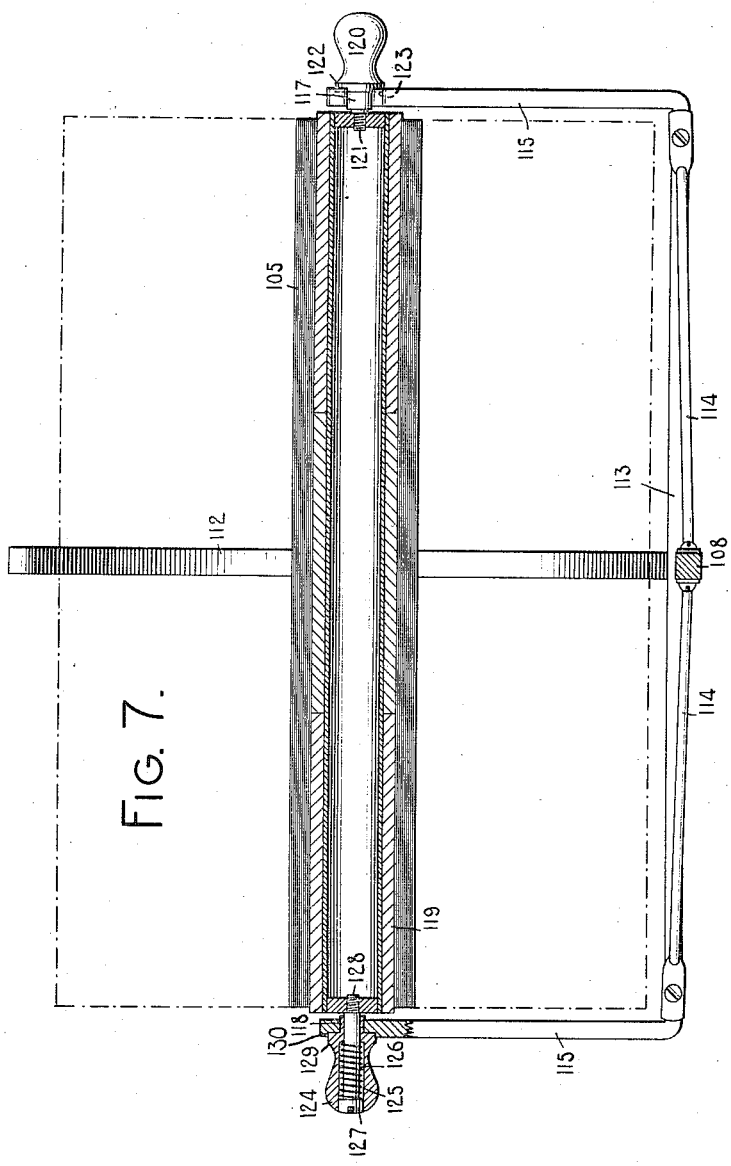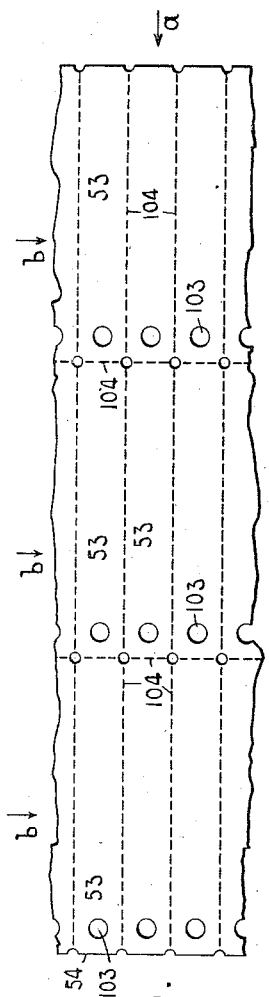

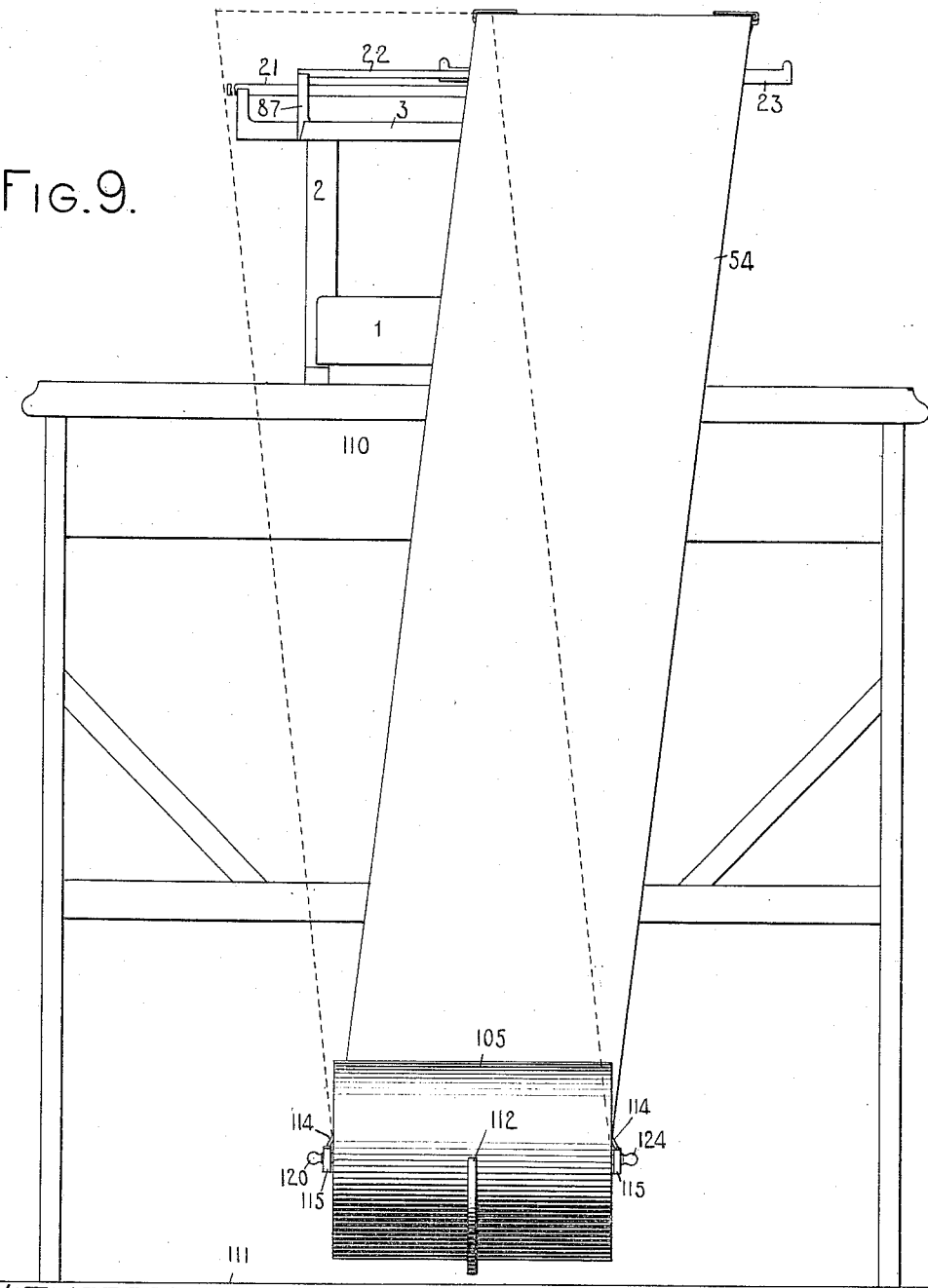

UNITED STATES PATENT OFFICE.

CLIO B. YAW, OF NEW YORK, N. Y., ASSIGNOR TO WYCKOFF, SEAMANS & BENEDICT, OF ILION, NEW YORK, A CORPORATION OF NEW YORK.

TYPE-WRITING MACHINE.

979,630.  Specification of Letters Patent.  Patented Dec. 27, 1910.

Application filed September 5, 1906. Serial No. 333,335.

*To all whom it may concern:*

Be it known that I, CLIO B. YAW, a citizen of the United States, and resident of the borough of Brooklyn, city of New York, in the county of Kings and State of New York, have invented certain new and useful Improvements in Type-Writing Machines, of which the following is a specification.

My invention relates to typewriting machines and more particularly to machines for writing tags, labels or the like and the invention is in the nature of an improvement on the construction described and claimed in my application No. 308,878, filed March 30th, 1906, and certain of the features herein shown are claimed broadly in said prior application.

Various objects of the invention will appear in the following description and the invention consists in the features of construction, arrangements of parts and combinations of devices to be hereinafter described and claimed.

Figure 1:
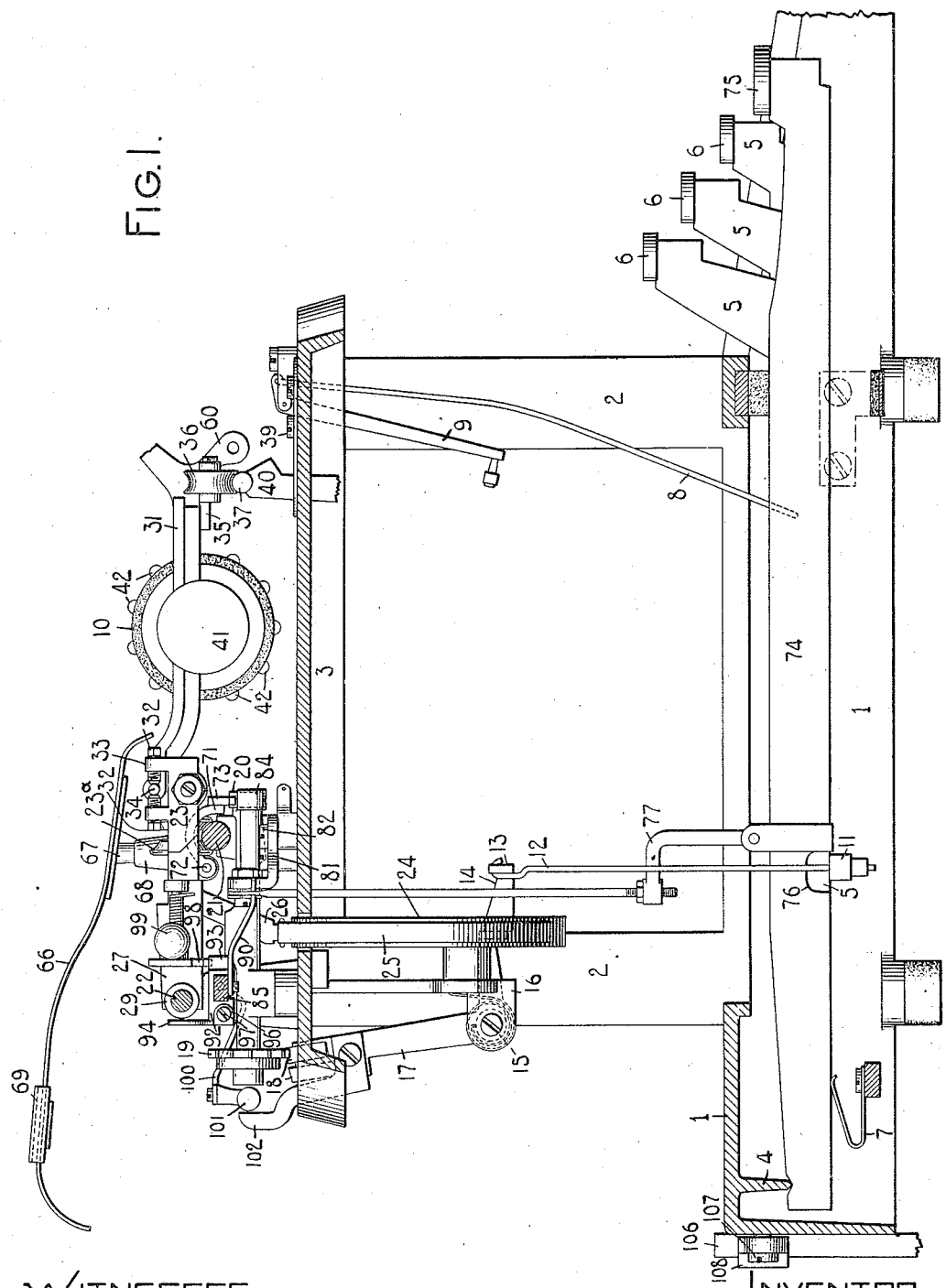
Figure 2:
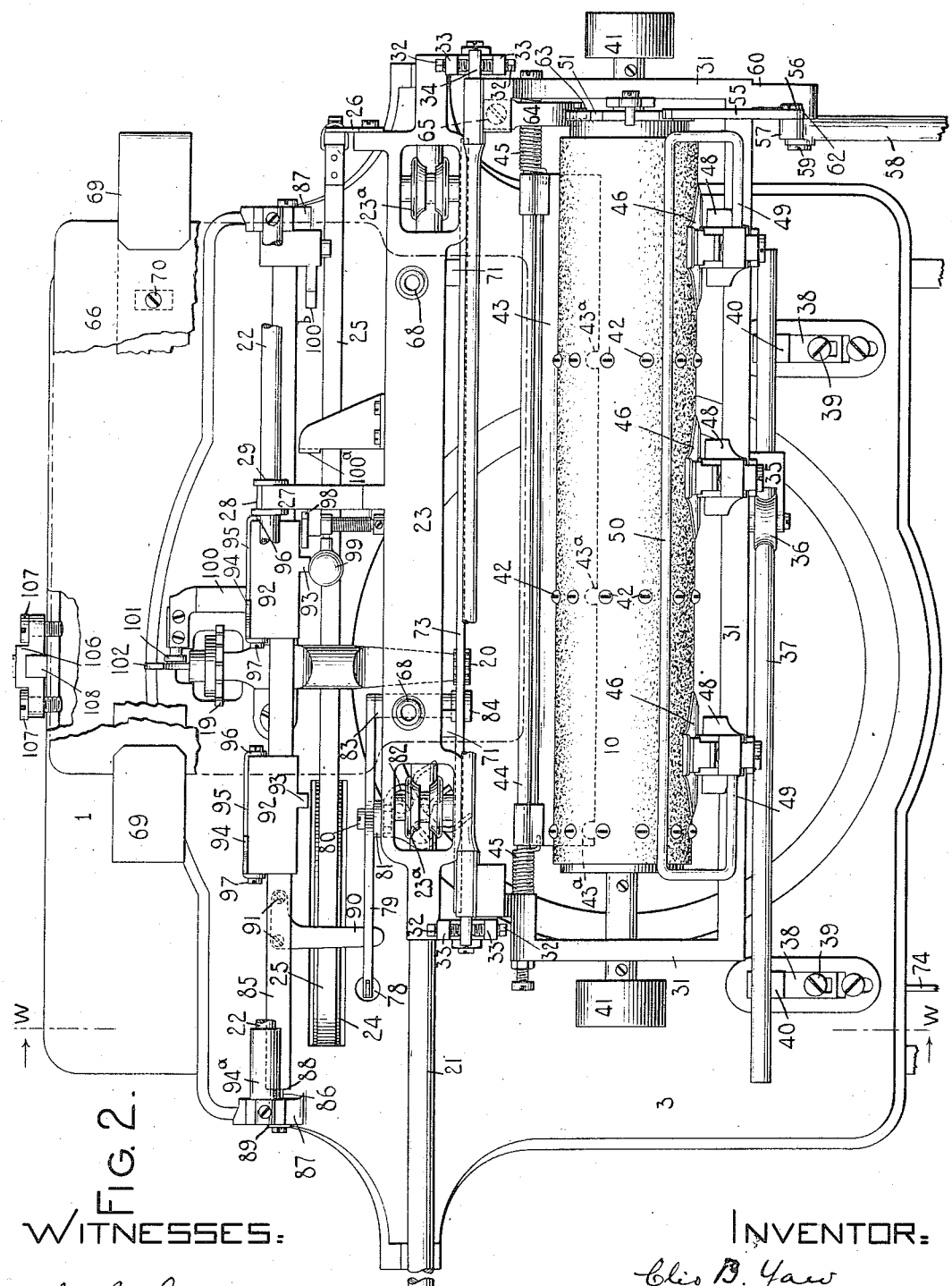
Figure 3:
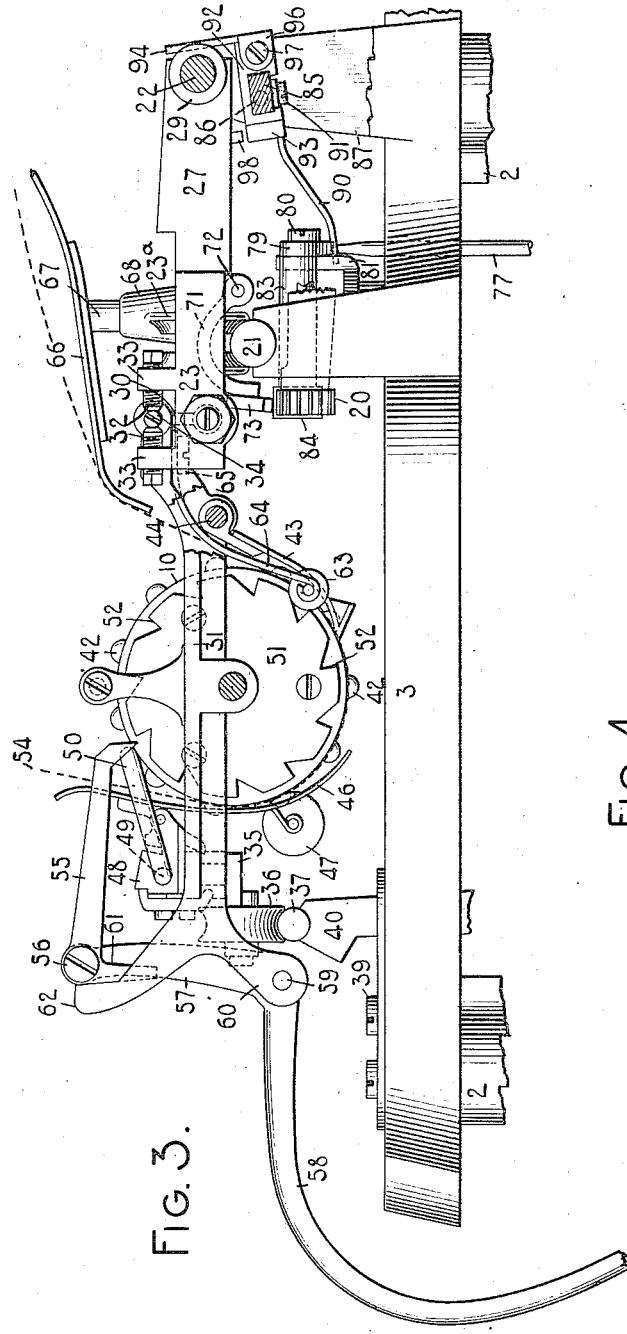
Figure 4:
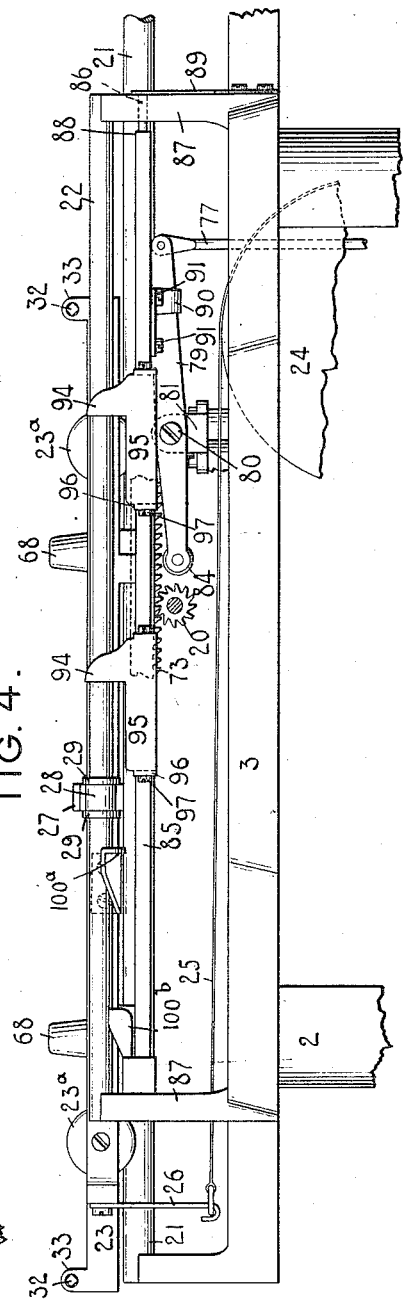

In the accompanying drawings wherein like reference characters indicate corresponding parts in the various views, Figure 1 is a vertical front to rear sectional view with parts broken away of one form of the machine embodying my invention, the section being taken on the line *w—w* of Fig. 2 and looking in the direction of the arrows at said line. Fig. 2 is a plan view of the same. Fig. 3 is a side elevation with parts broken away and showing the upper portion of the machine. Fig. 4 is a rear elevation of the upper portion of the machine with parts omitted and parts broken away. Fig. 5 is a side elevation of the machine shown supported upon a table. Fig. 6 is a detail rear view of the roll holder or bracket. Fig. 7 is a transverse sectional view of the roll holder taken on the line *x—x* of Fig. 5 and looking in the direction of the arrow at said line; Fig. 7 being taken on a larger scale than Fig. 6. Fig. 8 is a detail face view of the work sheet. Fig. 9 is a rear elevation of the machine as shown in Fig. 5.

I have shown my invention as applied to a typewriting machine generally resembling the No. 6 Remington, but it should be understood that the nature of the invention is such that it may be readily adapted to other forms of typewriting machines. I have furthermore shown a form of my invention which is specifically adapted for use with a perforated strip or work sheet of the style shown in Fig. 8 of the drawings, said strip being adapted to the preparation of car record tags for a car record apparatus such as that shown and described in the patent to W. E. Beecham, No. 618,388, dated January 31st, 1899. It will be obvious, however, that the perforated work sheet of the character shown is only one of many forms of work sheet with which my invention may be employed.

Referring more particularly to Figs. 1 and 2, the frame of the machine comprises a base 1, corner posts 2 and a top plate 3. A fulcrum strip 4 is formed on the base of the machine for coöperation with key levers 5 provided with the usual finger keys 6 and restoring springs 7. Each key lever 5 is connected by a link 8 to a type bar 9 adapted to coöperate with a platen 10. A universal bar 11 extends beneath the various key levers 5 and is connected at its ends to upwardly extending links 12 which in turn are connected to a transverse bar 13 supported by a forwardly extending arm 14 which projects from the dog rocker 15 mounted at its ends in a bracket 16 supported from the top plate of the machine. The upwardly extending arm 17 of the dog rocker is provided with carriage feed dogs 18 which coöperate with an escapement wheel 19 operatively connected in the usual manner to a feed pinion 20. Guide rods 21 and 22 support and guide a carriage truck 23 which constitutes a part of the carriage which moves from side to side of the machine, the truck being carried by rollers 23$^e$ that coöperate with the rod 21. A spring drum 24 has one end of a band 25 connected thereto, the other end of the band being connected to an arm 26 which projects from the truck. A rearwardly extending arm 27 projects from the carriage truck and is bifurcated at its rear end to embrace a sleeve 28 which has flanges 29 at the ends thereof and which is adapted to slide along the guide rod 22'. Links 30 (Fig. 3) connect a platen frame 31 to the truck, the platen frame being pivoted to the links to afford a swinging movement of the platen frame when desired. Set screws 32 extend through arms 33 in the truck and engage pivot pins 34 of the platen frame. In the Remington machine this construction permits of the case-shift motion of the platen frame, but in the present construction the set screws 32 are screwed toward each other so as to bear against the pivot pins 34 and prevent any forward or backward movement of the platen fame on the links 30. The forward portion of the platen frame 31 is provided with a block 35 in which a grooved roll 36 is mounted, said grooved roll coöperating with a rod or rail 37 which corresponds to the ordinary shift rail of the Remington machine but which in this instance is fixed against shifting movement by locking plates 38 secured in place by screws 39 and coöperating with the supporting arms 40 of the shift rail to prevent movement of said arms and rail.

The platen 10 is a cylindrical platen mounted to turn in bearings in the platen frame and provided with finger wheels 41. Arranged at different points throughout the length of the platen and intermediate of the ends thereof are work sheet engaging devices, or projections 42, which in the present instance are shown as the heads of screws and are arranged in three circumferentially arranged sets. These projections extend outwardly from the face of the platen and are adapted to coöperate with the work sheet, as will hereinafter more clearly appear, to positively effect a forward feed of the work sheet with the platen. A paper apron 43 is pivoted on a rod 44 and is maintained against the platen under pressure of springs 45 (Fig. 2). The lower edge portion of the paper apron 43 is apertured as indicated at 43ª to permit the projections 42 to pass without displacing the paper apron from contact with the face of the platen. Secured to the forward cross bar of the platen frame are three paper guides 46 similar to that employed in the No. 6 Remington machine and which coöperate with the platen in the three parts thereof into which said platen is divided by the three sets of projections 42. Each of these paper fingers or guides carries a feed roller 47 and is mounted in an adjustable block 48 secured to the front cross bar of the platen frame.

The two end blocks 48 are recessed to receive the inwardly bent ends 49 of a yoke-like gravity stripper 50 which extends throughout or substantially throughout the length of the platen above the points where the paper fingers 46 contact with the platen. This stripper is in the nature of a pivoted gravity device which bears by its own weight against the face of the platen and is moved away from the platen by the projections 42 as they reach contact with the stripper. The purpose of this stripper is to prevent the work sheet from being carried around with the platen beyond the point where the stripper is situated and to positively disengage the work sheet from the projections should this engagement continue up to the stripper.

The right-hand end of the platen is provided with a line spacing wheel 51, the teeth 52 of which are spaced apart at distances corresponding to the distance from the center of one tag 53 of the work sheet 54 (see Fig. 8) to the center of the next adjacent tag 53 in the same longitudinal row. Coöperating with this line spacing wheel is a line spacing pawl 55 pivoted at 56 to the upwardly projecting arm 57 of a hand lever 58 pivoted at 59 to a depending bracket arm 60 on the platen frame. The pawl 58 has a depending arm 61 which coöperates with a fixed abutment 62 to limit the forward movement of the pawl and its carrier and to raise the pawl out of engagement with the line spacing wheel when the parts return to normal position. Each actuation of the line spacing lever effects a line feed movement of the platen a distance corresponding to the distance from the center of one tag of the work sheet to the center of the next adjacent or oncoming tag in the same longitudinal row. A detent roller 63 coöperates with the teeth of the line spacing wheel and is mounted in a bearing at the free end of a spring 64 which is secured by a screw 65 to the platen frame. A paper table 66 has depending studs 67 which are received in bearings 68 on the carriage truck. This paper table is provided with guide arms 69 which are U-shaped in cross section, the lower arm of each of said guides being secured to the under side of the paper table by a screw 70 and projecting outwardly beyond the end of the paper table to which it is secured and then turning upwardly and inwardly toward the paper table to form a pocket or guide to receive an edge of the work sheet as it passes from the work sheet roll to the paper table, and to properly direct the work sheet in its movement toward the platen as will hereinafter more clearly appear.

By reference to Fig. 3 it will be seen that arms 71 are pivoted to the truck at 72 and that said arms carry at their forward ends a carriage feed rack 73 which coöperates with the feed pinion 20 to afford a step-by-step feed movement of the carriage from right to left during the actuation of the printing keys. A key lever 74 is fulcrumed on the fulcrum bar 4 like the printing key levers and is provided with a finger key 75. This key lever 74 is apertured or cut out at 76 above the universal bar so that a depression of the key 75 is ineffective to actuate the universal bar. An upwardly extending two-part link 77 is pivotally connected at its lower end to the key lever 74 and said link extends upward through an opening 78 in the top plate above which it is connected to a lever 79 pivoted at 80 to a bracket 81 secured to the top plate of the machine by a screw 82 which secures one of the type bar hangers in place. The inner end of the lever 79 is provided with a forwardly extending arm 83 which carries a roller 84 situated beneath the carriage feed rack 73 and adjacent to the feed pinion 20. A depression of the key 75 is effective to elevate the roller 84, which elevates the carriage feed rack 73, thus disengaging it from the feed pinion to release the carriage from its step-by-step feed mechanism.

A bar 85 is reduced at its ends as at 86 to form cylindrical bearing portions which are received in bearing openings in upwardly extending lugs 87 which project from the top plate of the machine and support the carriage guide rod 22. The distance between the shoulders 88 formed by the reduced portions 86 is slightly less than the distance between the inner faces of the lugs 87, so as to afford a slight longitudinal as well as a turning movement of the rod 85 in its bearings. When the parts are in their normal positions, shown in Fig. 2, the rod 85 is maintained at the limit of its movement toward the right by a leaf spring 89 which bears against the left-hand reduced or bearing portion 86 on the rod which projects through the bearing opening in the associate lug 87 so that the spring 89 may contact therewith. This rod 85 will hereinafter be referred to as a line lock rod and is provided with a forwardly extending arm 90 secured thereto by screws 91 and projecting at its forward end beneath the left-hand end of the lever 79 so that a depression of this end of the lever by an actuation of the key 75 is effective to rock the rod or rock shaft 85. The line lock rod also carries stop blocks 92, two of such blocks being shown in the present instance. Projecting forwardly from each block is a stop member 93 which I will refer to as a line lock stop. The rear side of each stop block 92 carries an upwardly projecting stop member 94, which I will refer to as a tabulating stop. This tabulating stop is an upwardly extending projection formed from a sheet metal strip, the body portion 95 of the strip extending throughout the length of the associated block 92 and being bent forwardly at its ends as at 96 to form ears which are perforated to receive headed screws 97 by which the stop member is rigidly secured to its block. Both of the stop blocks 92 and the parts carried thereby are alike and the description of one applies to the other. The stop blocks are secured in any suitable manner at the desired points along the rod 85, such points being determined by the distances between the sets of circumferentially arranged projections 42 on the platen as will hereinafter more clearly appear.

A line lock stop member 98 is pivoted in suitable bearings on the carriage and is provided with a counterweight 99 by which it is held in the normal position. This stop member is of the usual construction employed in the No. 6 Remington machine and a detailed description thereof is deemed unnecessary. The stop 98 normally extends to a position where it will be brought into contact with the line lock stops 93 when the carriage moves from right to left and will effect a longitudinal movement of the rod 85 through the pressure of the carriage spring when the stop 98 and either of the stops 93 are brought into contact. This movement of the rod 85 from right to left is effective to move an arm 100 secured to the rod in the same direction and to bring a locking abutment 101 carried by said arm into the path of a locking arm 102 secured to the dog rocker so as to lock the dog rocker against movement, thereby preventing a depression of the universal bar and locking the printing keys, printing instrumentalities and escapement mechanism out of operation. After the machine has been locked out of operation in the manner described a depression of the release key 75 at the key board of the machine is effective to depress the left-hand end of the lever 79, thereby rocking the bar 85 and moving the engaged stop 93 out of the path of and out of coöperation with the stop 98, thus freeing the line lock mechanism and allowing the parts thereof to be restored to their right-hand positions, and raising the locking member 101 up above the end of the arm 102. The same actuation of the release key is effective to release the carriage in the manner which has been described, and to move the stops 94 into the path of the flanged sleeve 28—29 which in effect constitutes a tabulating stop carried by the carriage so that when the carriage is released one of the stops 94 is in position to receive the impact of the stop 28—29, thus arresting the carriage at a predetermined point in its travel. When the carriage makes a complete travel from right to left and a point near the right hand side of one of the right hand tags has been brought to the printing point, the stop 28—29 will be brought into contact with a sleeve 94$^a$ on the rod 22, said sleeve acting as a final stop to prevent further movement of the carriage toward the left.

From what has been said it will be understood that when the line lock mechanism is brought into operation by the coöperation of the stop 98 with one of the stops 93 the line lock mechanism will be automatically actuated to lock the machine out of operation; that after such locking has been effected a depression of the release key 75 is effective to release the line lock mechanism and to bring the tabulating mechanism into operation and to release the carriage from its step-by-step feed mechanism so that the carriage may be arrested by the tabulating mechanism at a predetermined point in the travel of the carriage. When the carriage is arrested by the tabulator stops 28—29, and 94, the bar 85 is again moved toward the left, but this does not effect a line-locking operation because the locking member 101 is then standing above the end of the arm 102. When the carriage is drawn toward the right it is arrested by a stop 100$^a$ mounted on the carriage, contacting with a margin stop 100$^b$ mounted on the bar 85. These stops arrest the carriage at the proper point to begin the new line, and they prevent the left-hand set of projections 42 on the platen from ever reaching the printing point.

Referring now particularly to Fig. 8, it will be seen that the work sheet or web 54 comprises a plurality of tags 53 each apertured near its left-hand end at 103 and that there are three longitudinal rows $b$ of tags and that there are various transverse rows $a$ so that as the work sheet is fed to the platen in the direction of the arrows at $b$ the rows $a$ of tags (three in each row) will be successively brought to the printing line. The engaging projections 42 on the platen are spaced apart to correspond to the spacing between the apertures 103 in the tags so that as the tags are fed forward a projection will engage each of the apertures 103 and positively and effectively feed the work sheet forward. The various tags of the work sheet are attached but are perforated at 104 in order that they may be readily detached one from another when desired. The contact faces of the stops 98 and 28—29 are arranged in the same vertical plane fore and aft of the machine so that when the stop 98 is in contact with one of the stops 93 the tabulating stop 28—29 will be in the same plane as the contact face of the engaged stop 93 and the distance between the stop 93 and the associated tabulating stop 94 corresponds to the space which the carriage is to be skipped or jumped after it is once locked and it is again released by the depression of the key 75. This tabulating operation, which is also effective to release the line lock mechanism, affords a movement of the carriage a distance corresponding to the distance between the last written character on one tag in the transverse row $a$ and the first character to be written on the next adjacent tag in the same row. This movement is likewise effective to carry the intermediate projections 42 past the printing point so that all danger of the operator causing the printing instrumentalities to strike the projections 42 on the face of the platen is obviated. When the first of the three tags in one of the transverse rows has been written, a depression of the key 75 will release the carriage and cause it to be arrested at the proper point to begin the writing of the next tag, whether or not the writing on the first tag extended far enough to bring the line-lock into operation.

By my present construction I am enabled to provide a work sheet with a plurality of tags which extend longitudinally of the platen and to write or fill in these tags without affecting a line spacing operation of the platen. A line spacing movement of the platen is effective to bring the next three alined tags of a row $a$ to the printing line so that they may be written upon, and so on. Thus the construction enables the operator to efficiently and quickly fill in the tags at the expenditure of a minimum amount of labor.

I prefer in the present instance to convey the work sheet from a work sheet roll 105 which is preferably situated at a distance from the machine sufficiently remote to enable the work sheet to be fed to the platen without affecting the feed of the work sheet by the travel of the carriage and without interfering with the travel of the carriage, as will be fully appreciated, it is believed, from an inspection of Fig. 9. In the present instance I have provided a clamp 106 which is adapted to be secured by screws 107 to the rear of the base of the machine. This clamp is apertured to receive a depending stem 108 of a roll holder designated as a whole by the reference numeral 109. When the machine is supported upon a table or other suitable support 110, the lower end of the roll holder will preferably be adjacent the floor 111 on which the typewriter table is supported in order that the construction may occupy as little space as possible and at the same time enable the work sheet roll to be maintained at a proper distance from the machine to effect the desired result. The stem 108 of the roll holder is extended around at its lower end to form a curved arm 112 which embraces the work sheet roll. This arm will prevent the paper from dragging on the floor in case the roll accidentally becomes partially unrolled. Laterally projecting arms 113 extend on opposite sides of the stem 108 and these arms are braced by rods 114 which connect at their lower ends with the arms 113 and at their upper ends with the stem 108. The arms 113 are bent rearwardly at their ends to form bearing arms 115 on each side of the work sheet roll. The rear ends of the arms are bifurcated or notched at 116 to provide open-mouth bearings which receive bearing spindles 117, 118 connected to a mandrel or cylinder 119 which supports the work sheet roll 105. The spindle 117 is formed as a part of a finger piece 120 which has a screw 121 that takes into a threaded opening in one end of the mandrel 119 and thus rigidly connects the finger piece and spindle to the mandrel. A circumferential flange 122 is provided on the finger piece 120, said flange being adapted to be received in a depression 123 on the outer face of the associated arm 115. The spindle 118 is formed as a part of a spring pressed finger piece 124 and has an opening 125 therein for the reception of a spring 126. A headed screw 127 passes through an opening in the finger piece and is received at its threaded end 128 in one head of the mandrel 119. A circumferential flange 129 is provided on the finger piece 124 and is received in a corresponding opening 130 in the outer face of the associated arm 115 of the roll holder. The spring 126 forces the flange 129 into its bearing and tends to maintain the flange 122 at the opposite end of the spindle in its bearing by drawing the finger pieces 120 and 124 toward each other so as to lock the mandrel in its bifurcated bearings and to enable the mandrel and work sheet roll to be readily removed when desired by moving the finger piece 124 against the tension of its spring, thereby withdrawing the locking flange 129 from its bearing when the roll with its mandrel may receive a slight movement to the right in Fig. 7 in order to disengage the locking flange 122 from its bearing when the roll and mandrel may be removed. It will be understood that the axis of the work sheet roll is maintained fixed and is parallel with the axis of the platen; that nevertheless, the construction is such that the work sheet as it passes from the roll up and over the rear edge of the paper table and between the guides 69 is effectively directed to the platen without being buckled or distorted. An inspection of Fig. 9 will indicate that the travel of the carriage is ineffective by this arrangement to appreciably affect the work sheet in its feed to the platen.

Fig. 9 shows the position of the work roll, and the general direction of feed of the paper from the roll up to the paper table in the two extreme positions of the carriage is indicated in full and dotted lines respectively. The edges of the paper in these extreme positions, are not as rigidly straight as is indicated in the drawing, but the curvature is not enough to wrinkle the paper, said curvature consisting chiefly of a slight sag of the paper at one side or the other. The entire weight of the roll holder is removed from the carriage, thus facilitating rapidity and accuracy of operation and enabling me to provide a device which is simple in construction and efficient in operation. Great difficulty has been encountered heretofore in that class of machines in which the work sheet roll was supported by and carried with the carriage. By my present invention these difficulties are entirely overcome and yet the efficiency of the machine in other respects is not detracted from.

The operation is as follows: The leading edge of the work sheet 54 is taken from the roll 105 up and over the rear edge of the paper table and through and between the guides 69 as shown in Figs. 5 and 9. When the first of the transverse rows a of tags is at the printing line the operator moves the carriage to the right until it is arrested by the stops 100ª and 100ᵇ, which will bring the first (or left hand) of the three tags at the printing line into position to receive the first character to be written thereon. The operator proceeds to fill in this tag on the machine and before the end of the tag is reached the stop 98 will contact with the right-hand stop 93 moving the line lock bar 85 to the left and locking the printing instrumentalities out of operation. The operator then depresses the key 75 which results in releasing the line lock mechanism, releasing the carriage from its step-by-step feed mechanism and interposing the right-hand stop 94 in the path of the stop 28—29 as shown in Fig. 3, thereby arresting the carriage in a position to receive the first character to be written on the second of the tags (from left to right) at the printing line. The operator may then proceed to fill in the second tag and before the end of this tag reaches the printing point the stop 98 will contact with the left-hand stop 93 and the machine will again be locked out of operation. The operator again depresses the key 75, thereby releasing the line lock mechanism and carriage and arresting the latter by the left-hand stop 94 in a position to begin the third tag. Before the end of this tag is reached the stop 28—29 will contact with the stop 94ª and the carriage will be arrested against further movement to the left. The operator may now actuate the line spacing lever 58 to bring the next transverse row of three tags to the printing line and the operation of filling in the tags on the machine may proceed as before and so on until the roll of paper is exhausted.

From what has been said it will be understood that the carriage releasing means and the stops 94, 28—29, 93 and 98 constitute carriage skipping means for causing predetermined minimum extents of movement of the carriage to be effected and that the distance between the effective faces of each set of associated stops 93 and 94 determines a minimum extent of movement that the carriage may be skipped, this distance corresponding to the distance between the last point at which characters may be written on one tag and the first point where characters may be written on the next succeeding tag in the same transverse line. It will also be understood from the foregoing description that the No. 6 Remington machine may be readily modified to embody my invention and that the structure is simple in construction and rapid and efficient in use.

By taking the work sheet from the roll at a distance which is remote from the platen, the angle of the edges of the work sheet to the axis of the platen is so slight in any position of the carriage that the feed of the work sheet is not affected by the travel of the carriage and the weight of the work sheet roll is entirely removed from the carriage.

Various changes may be made without departing from my invention.

What I claim as new and desire to secure by Letters Patent, is:—

1. In a typewriting machine, the combination of a carriage, key-actuated printing instrumentalities, a platen coöperative with a work sheet of tags comprising a plurality of alined tags arranged at different points in the length of the platen, letter spacing means, and means for effecting a movement of the carriage to bring the first letter space position on one tag to the printing point after another tag has been written.

2. In a typewriting machine, the combination of a carriage, key-actuated printing instrumentalities, a platen coöperative with a work sheet of tags, comprising a plurality of alined tags arranged at different points in the length of the platen, and in different longitudinal rows, and line spacing means, each operation of which is effective to bring a set of alined tags to the printing line.

3. In a typewriting machine, the combination of a carriage, a platen coöperative with a work sheet of tags, comprising a plurality of alined tags arranged at different points in the length of the platen and in different longitudinal rows, line spacing means, each operation of which is effective to bring a set of alined tags to the printing line, letter spacing means, and means for effecting a movement of the carriage to bring the first letter space position on one tag to the printing point after another tag has been written.

4. In a typewriting machine, the combination of a carriage, a platen coöperative with a work sheet comprising a plurality of tags arranged longitudinally of the platen and also arranged in different longitudinal rows, work sheet engaging means on the platen coöperative with the tags in the different longitudinal rows, letter spacing means, and means for effecting a movement of the carriage from one tag to another along the line of print and for skipping over the work sheet engaging means for the different tags.

5. In a typewriting machine, the combination of a carriage, a platen coöperative with a work sheet comprising tags arranged in different transverse and longitudinal rows, an aperture in each tag, a series of projections on the platen, said projections being coöperative with the apertures in the different tags as they are fed through the machine, means for effecting a line feed of the platen, and means for preventing any of said projections from being arrested at the printing point.

6. In a typewriting machine, the combination of a carriage, a platen coöperative with a work sheet comprising tags arranged in different transverse and longitudinal rows with an aperture in each tag, a series of projections on the platen, said projections being coöperative with the apertures in the different tags as they are fed through the machine, and means for effecting a line feed of the platen to bring one transverse row of tags after another to the printing line.

7. In a typewriting machine, the combination of a platen, work sheet feeding means on the platen at different points in the length thereof, and means for affording a travel of the platen so as to avoid arresting said work sheet feeding means at the printing point.

8. In a typewriting machine, the combination of a platen, a plurality of circumferentially arranged sets of work sheet feeding projections on the platen at different points in the length thereof, and means for affording a travel of the platen so as to avoid bringing said work sheet feeding projections to the printing point so as to prevent the types from striking said projections.

9. In a typewriting machine, the combination of a platen, work sheet feeding means on the platen at different points in the length thereof, letter feed mechanism for effecting a step-by-step feed of the carriage, and key actuated means for skipping said work sheet feeding means intermediate the ends of the platen and for properly positioning the work sheet.

10. In a typewriting machine, the combination of a platen, a plurality of sets of circumferentially arranged work sheet feeding projections on the platen at different points in the length thereof, letter feeding mechanism for effecting a step-by-step feed of the carriage, and key actuated means for skipping said work sheet feeding projections intermediate the ends of the platen and for properly positioning the work sheet.

11. In a typewriting machine, the combination of a carriage, escapement mechanism, locking mechanism for automatically locking the machine out of operation at different points in a single travel of the carriage, a key, and means controlled thereby for releasing the line lock mechanism and freeing the carriage from its escapement mechanism for affording a free run of the carriage after the machine is locked out of operation by said locking mechanism.

12. In a typewriting machine, the combination of a carriage, a platen, work sheet feeding means on the platen at different points in the length thereof, locking mechanism for automatically locking the machine out of operation before the work sheet feeding means is reached, and key actuated means for affording a given extent of run of the carriage after the machine is locked out of operation by said locking mechanism, in order to prevent the work sheet feeding means from being arrested at the printing point.

13. In a typewriting machine, the combination of a carriage; escapement mechanism therefor, a platen coöperative with a work sheet comprising a plurality of alined tags arranged longitudinally of the platen; locking mechanism operative to automatically lock the machine out of operation at a plurality of points in a single run of the carriage, said locking mechanism including a plurality of line locking stops spaced apart substantially to correspond to the spacing of the tags longitudinally of the platen, and hand actuated means for simultaneously releasing the line lock mechanism and for freeing the carriage from its escapement mechanism.

14. In a typewriting machine, the combination of a carriage, a platen coöperative with a work sheet comprising a plurality of alined tags arranged longitudinally of the platen, and means for automatically locking the machine out of operation, the automatic locking means being in operation just before the end of each tag is reached.

15. In a typewriting machine, the combination of a carriage, a platen coöperative with a work sheet comprising a plurality of alined tags arranged longitudinally of the platen, means for automatically locking the machine out of operation before the end of each tag is reached, and key actuated means for affording a skipping movement of the carriage after a locking operation to bring the next succeeding tag to the proper position to receive the first imprint of a line to be written thereon.

16. In a typewriting machine, the combination of a carriage, locking mechanism operative to automatically lock the machine out of operation, and key actuated means operative by a single actuation to release said locking mechanism and to cause the carriage to skip in the direction of its feed and be arrested at a predetermined point.

17. In a typewriting machine, the combination of a carriage, locking mechanism operative to automatically lock the machine out of operation at a plurality of points in a single run of the carriage, and key actuated means for releasing said locking mechanism and for causing the carriage to skip and be arrested at a predetermined point.

18. In a typewriting machine, the combination of a carriage, a platen coöperative with a work sheet comprising a plurality of alined tags arranged longitudinally of the platen, means for automatically locking the machine out of operation before the end of each tag is reached, and key actuated means for releasing the locking means and by the same operation effecting a skipping movement of the carriage to bring another tag into position to receive the first imprint of a line to be written thereon.

19. In a typewriting machine, the combination of key-actuated printing instrumentalities, a carriage, a rotary platen carried by the carriage and having positive engaging devices coöperative with a work sheet comprising a plurality of tags, line spacing mechanism operative at each actuation to turn said platen a sufficient distance to bring a new line of tags to the printing line, and means whereby said projections are prevented from being brought to the printing point during printing operation.

20. In a typewriting machine, the combination of a carriage, a platen having engaging devices coöperative with a work sheet comprising a plurality of rows of tags, line spacing mechanism operative at each actuation to bring a new row of tags to the printing line, key actuated means operative at each actuation to afford a movement of the carriage corresponding to the distance between the last letter space position on one tag to the first letter space position on another tag, and automatically operating means for preventing the engaging devices from being brought to the printing point during printing operation.

21. In a typewriting machine, the combination of a platen having engaging devices coöperative with a work sheet comprising a plurality of tags arranged in rows widthwise and lengthwise of the sheet, line spacing mechanism operative at each actuation to bring a new row of tags to the printing line, and means for automatically locking the machine out of operation when a predetermined point on each tag is reached.

22. In a typewriting machine, the combination of a platen coöperative with a work sheet comprising a plurality of rows of tags, line spacing mechanism operative at each actuation to bring a new line of tags to the printing line, means for automatically locking the machine out of operation when a predetermined point on each tag is reached, and key actuated means for releasing said locking means and by the same operation bringing another tag to the printing point.

23. In a typewriting machine, the combination of a carriage, a platen having work sheet engaging means at different points in the length of the platen, said engaging means being coöperative with a work sheet comprising a plurality of tags, spacing mechanism operative at each actuation to bring a new line of tags to the printing line, and means for automatically locking the machine out of operation before the work sheet engaging means for the different tags reaches the printing point.

24. In a typewriting machine, the combination of a carriage, a platen having work sheet engaging means at different points in the length of the platen, said engaging means being coöperative with a work sheet comprising a plurality of tags, spacing mechanism operative at each actuation to bring a new line of tags to the printing line, means for automatically locking the machine out of operation before the work sheet engaging means for the different tags reaches the printing point, and means for releasing said locking means and for skipping the carriage so as to prevent said engaging means from being arrested at the printing point.

25. In a typewriting machine, the combination of a carriage, a platen having work sheet engaging projections at different points in the length of the platen, said engaging means being coöperative with a work sheet comprising a plurality of connected apertured tags, the apertures in which are engaged by said projections, spacing mechanism operative at each actuation to bring a new line of tags to the printing line, a letter space feed device, means for automatically locking the machine out of operation before a projection is reached, and key actuated means for releasing said locking means and by the same actuation causing the carriage to skip in order to bring a new tag to the printing position and to prevent any of said projections from being arrested at the printing point.

26. In a typewriting machine, the combination of a carriage, a platen coöperative with a work sheet comprising a plurality of tags that extend longitudinally of the platen, and carriage controlling means comprising stops, the distance between the effective faces of certain of said stops corresponding to the distance between the last point at which characters may be written on one tag and the first point where a character may be written on the next succeeding tag.

27. In a typewriting machine, the combination of a carriage, a platen coöperative with a work sheet comprising a plurality of tags that extend longitudinally of the platen, carriage, skipping and locking means comprising stops, the distance between the effective faces of certain of said stops corresponding to the distance between the last point where a character may be written on one tag and the first point where a character may be written on the next succeeding tag, the locking means automatically locking the machine out of operation when the last character on one tag is written, the actuation of the carriage skipping means being operative to unlock said locking means.

28. In a typewriting machine, the combination of a carriage, a platen coöperative with a work sheet comprising a plurality of tags that extend longitudinally of the platen, work sheet engaging means carried by the platen at different points throughout the length of the platen, carriage skipping and controlling means comprising stops, the distance between the effective faces of certain of said stops corresponding to the distance between the last written character on one tag and the first character to be written on the next succeeding tag, whereby said skipping means are operative not only to bring about the proper movement of successive tags to the printing point but also to carry the work sheet engaging means past the printing point.

29. In a typewriting machine, the combination of a carriage, a platen coöperative with a work sheet comprising a plurality of tags that extend longitudinally of the platen, carriage skipping and locking means comprising stops, the distance between the effective faces of certain of said stops corresponding to the distance between the last written character on one tag and the first character to be written on the next succeeding tag, said locking means automatically locking the machine out of operation when the last character on one tag is written, the actuation of the carriage skipping means being operative to unlock said locking means, whereby said skipping and locking means are operative not only to automatically lock the machine out of operation at the end of a tag and to bring about the proper movement of successive tags to the printing point and the proper positioning of said tags relatively to the printing point but also to carry the work sheet engaging means past the printing point and to prevent the types from striking said engaging means.

30. In a typewriting machine, the combination of a carriage, a platen carried by said carriage and carrying work sheet engaging means, and means operating automatically to arrest the carriage before the work sheet engaging means reaches the printing point.

31. In a typewriting machine, the combination of a carriage, a platen carried by said carriage and carrying work sheet engaging projections, and means operating automatically to arrest the carriage before a work sheet engaging projection arrives at the printing point.

32. In a typewriting machine, the combination of a carriage, a platen carried by said carriage and carrying work sheet engaging projections, and automatically actuated means for throwing the machine out of operation before a work sheet engaging projection arrives at the printing point.

33. In a typewriting machine, the combination of a carriage, a platen carried by said carriage and carrying work sheet engaging means, and automatically actuated line lock mechanism operative before the work sheet engaging means reaches the printing point.

34. In a typewriting machine, the combination of a carriage, a platen coöperative with a work sheet comprising a plurality of alined tags that extend longitudinally of the platen, a platen carrying work sheet engaging means, and automatically actuated line lock mechanism operative successively before the ends of different ones of said alined tags are reached.

35. In a typewriting machine, the combination of a carriage, a platen carrying work sheet engaging means coöperative with a work sheet comprising a plurality of alined tags that extend longitudinally of the platen, automatically actuated line lock mechanism operative successively before the ends of different of said alined tags are reached, and key-actuated means for releasing the locking means and by the same actuation affording a skipping movement of the carriage to bring another tag to the printing point.

36. In a typewriting machine, the combination of a carriage, line lock mechanism, and key actuated means for releasing said line lock mechanism and by the same operation freeing the carriage and allowing it to travel in the direction of its feed and then arresting it at a predetermined point.

37. In a typewriting machine, the combination of a carriage, line lock mechanism operative at a plurality of points in a single travel of the carriage, and key actuated means for releasing said line lock mechanism and by the same operation freeing the carriage and arresting it at a predetermined point.

38. In a typewriting machine, the combination of a carriage, line lock mechanism, and key actuated means for releasing the line lock mechanism, and by the same operation freeing the carriage and allowing it to travel in the direction of its feed and interposing a stop in the path thereof.

39. In a typewriting machine, the combination of a carriage, step-by-step feed mechanism therefor, line lock mechanism, a stop, carriage releasing means, and key actuated means for releasing said line lock mechanism and by the same operation releasing the carriage and allowing it to travel in the direction of its feed and interposing the stop in the path thereof.

40. In a typewriting machine, the combination of a carriage, line lock mechanism, a line lock stop on the carriage, a line lock stop on the frame of the machine, a tabulating stop on the carriage, a tabulating stop on the frame of the machine, and key actuated means for throwing the line lock stops out of coöperation when they are brought into coöperation by the travel of the carriage in the direction of its feed and for at the same time bringing the tabulating stops one into the path of the other.

41. In a typewriting machine, the combination of a carriage, line lock mechanism, and tabulating mechanism, one of said mechanisms being under the control of the other and operative for alternately line locking and tabulating during a single travel of the carriage in the direction of its feed.

42. In a typewriting machine, the combination of a carriage, line lock mechanism, tabulating mechanism, carriage releasing mechanism, and key actuated means for simultaneously effecting an operation of all of said mechanisms to effect by a single operation a release of the line lock mechanism, a release of the carriage and an arrest thereof during the travel of the carriage in the direction of its feed.

43. In a typewriting machine, the combination of a carriage, line lock mechanism, tabulating mechanism, carriage releasing mechanism, and a single key for effecting a release of the line lock mechanism, for freeing the carriage and for operating the tabulating mechanism to effect an arrest of the carriage at a predetermined point in the travel thereof in the direction of its feed.

44. In a typewriting machine, the combination of a carriage, a platen coöperative with a work sheet comprising tags arranged longitudinally of the platen, line lock mechanism, a line lock stop on the carriage, a line lock stop on the frame of the machine, a tabulating stop on the carriage, a tabulating stop on the frame of the machine, the distance between the tabulating stops when the line lock stops are brought into coöperation corresponding to the distance from the last written character on one tag to the position where the first character is to appear on the next tag, and key actuated means for throwing the line lock stops out of coöperation and for at the same time bringing the tabulating stops one into the path of the other.

45. In a typewriting machine, the combination of a carriage, a line lock bar, coöperating line lock mechanism actuated by said bar, line lock and tabulating stops carried by said bar, coöperative line lock and tabulating stops, and key actuated means for actuating said bar to move one set of said stops out of coöperation and to render the other set of stops coöperative.

46. In a typewriting machine, the combination of a carriage, a line lock bar, coöperating line lock mechanism actuated by said bar, line lock and tabulating stops carried by said bar, coöperative line lock and tabulating stops, key actuated means for actuating said bar to move one set of said stops out of coöperation and to render the other set of stops coöperative, and carriage releasing means controlled by said key actuated means.

47. In a typewriting machine, the combination of a carriage, a line lock bar, coöperating line lock mechanism actuated by said bar, line lock and tabulating stops carried by said bar, coöperative line lock and tabulating stops, key actuated means for actuating said bar to move one set of said stops out of coöperation and to render the other set of stops coöperative, and carriage releasing mechanism operatively connected with said bar, whereby a single actuation of said bar by said key actuated means is effective to release the line lock, to release the carriage and to bring about an arrest of the carriage at a predetermined point by the tabulating stops.

48. In a typewriting machine, the combination of a platen carrying work sheet engaging devices, and a movable work sheet stripper coöperating with the platen and with said engaging devices to strip the work sheet therefrom.

49. In a typewriting machine, the combination of a platen carrying work sheet engaging devices, and a movable work sheet stripper coöperating with the platen and adapted to be moved away from the platen by said engaging devices.

50. In a typewriting machine, the combination of a platen, work sheet engaging projections that extend from the face of the platen, and a coöperating work sheet stripper.

51. In a typewriting machine, the combination of a rotary platen, a work sheet engaging device that rotates with the platen, and a gravity work sheet stripper that coöperates with the platen and with said work sheet engaging device.

52. In a typewriting machine, the combination of a rotary platen, a plurality of sets of circumferentially arranged work sheet engaging projections on said platen, and a work sheet stripper that extends throughout or substantially throughout the length of the platen and coöperates with the platen and with said projections.

53. In a typewriting machine, the combination of a platen, a work sheet stripper in the form of a pivoted wire bail which coöperates with the platen, and means for automatically actuating said stripper.

Signed at the borough of Manhattan, city of New York, in the county of New York, and State of New York this 4th day of Sept. A. D. 1906.

CLIO B. YAW.

Witnesses:
E. M. WELLS,
J. B. DEEVES.